Figure 1:
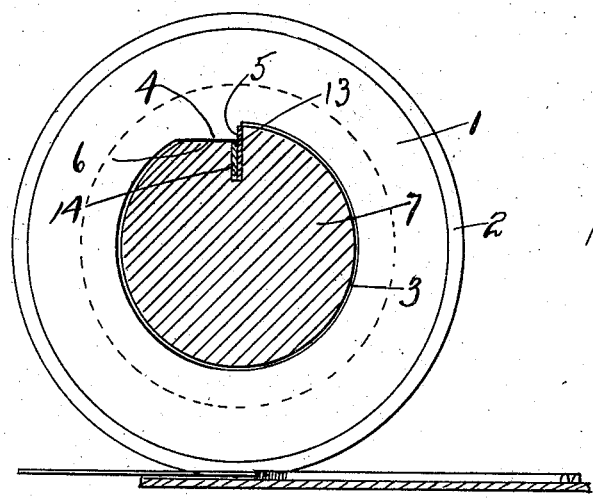

No. 857,356. PATENTED JUNE 18, 1907.
T. MORTON.
ROTARY CUTTER SHAFT FOR PILE CUTTING MACHINES.
APPLICATION FILED MAR. 20, 1907.

Inventor
Thomas Morton.

Witnesses
E. J. Ogden
A. Fulton

By Howard E Barlow
Attorney

UNITED STATES PATENT OFFICE.

THOMAS MORTON, OF CROMPTON, RHODE ISLAND.

ROTARY CUTTER-SHAFT FOR PILE-CUTTING MACHINES.

No. 857,356.  Specification of Letters Patent.  Patented June 18, 1907.

Application filed March 20, 1907. Serial No. 363,488.

*To all whom it may concern:*

Be it known that I, THOMAS MORTON, a citizen of the United States, residing at Crompton, in the county of Kent and State of Rhode Island, have invented certain new and useful Improvements in Rotary Cutter-Shafts for Pile-Cutting Machines, of which the following is a specification, reference being had therein to the accompanying drawing.

This invention relates to improvements in the construction of rotary cutter shafts for pile cutting machines, and has for its object to provide an abutment in the cutter shaft formed of a hardened steel plate to receive the thrust and strain of the cutter blades, and a further object of the invention is to set these abutment plates into a recess formed in the shaft to receive them and secure the same by means of keys or wedging strips.

In the construction of the ordinary pile cutting machine a large number of cutters are strung or loosely mounted on the cutter shaft, being separated the width of the races in the cloth by collars or spacers. These cutters are commonly made of comparatively thin hardened steel and in a circular form, the periphery being beveled to an edge and sharpened for the purpose of cutting the races in the cloth. A tooth or projecting portion is preferably formed to extend inward from the edge of the central bore of the cutter, and in ordinary practice enters a corresponding groove or spline in the cutter shaft thereby forming a key to prevent the cutters from turning on the shaft.

The central bore of these cutters is made a little larger than the diameter of the shaft and they are held loosely between the spacers so that the plates may be free to work slightly sidewise on the shaft to readily follow the races and accommodate themselves to any irregularities in the cloth.

It is found in practice very desirable to use a cutter of comparatively large diameter in order to obtain a high peripheral cutting speed, and it is also found advantageous to employ cutters constructed of extremely thin material. When such cutters are used on the ordinary shaft it is found that the tooth in moving about soon wears into the spline in the shaft, thereby holding the cutters against their necessary lateral adjustment, and causing them to run out of line and spoil the work. This objectionable effect is also found in the operation of the small cutters, but to a less degree than with the thinner cutters of the larger diameter.

My improved manner of providing a hardened steel abutment plate and inserting the same into the shaft is a simple and effective method of obviating all of the above difficulties, rendering it possible to successfully operate cutters of any size and thickness.

With these objects in view, the invention consists of certain novel features of construction, as will be more fully described and particularly pointed out in the appended claims.

Figure 2:
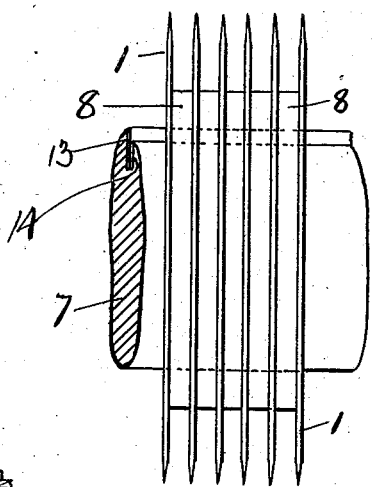
Figure 3:
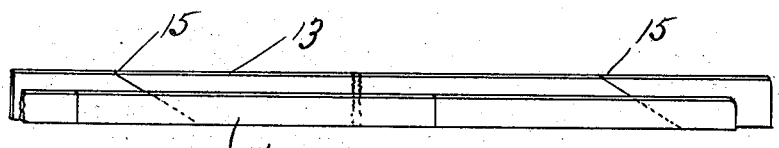
Figure 4:
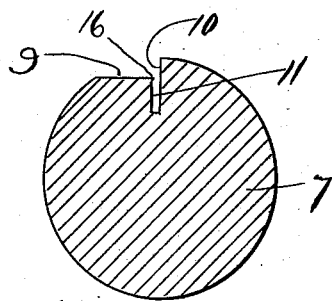

In the accompanying drawings: Figure 1—is a side elevation of a cutter mounted on a shaft and showing the inwardly extending tooth engaging the hardened steel abutment plate, which is secured in said shaft, the lower edge of the cutter being shown as entering the cutter guide and cutting the threads in the races in the formation of pile fabric. Fig. 2—shows a gang of cutters mounted on a shaft, and spaced by the collars between them. Fig. 3—is a perspective view showing the hardened abutment plate or blade together with a wedging gib strip which serves to bind the plate in the shaft. Fig. 4—is a sectional end view of the shaft showing the groove therein, which is adapted to receive and retain the abutment plate and its wedging strip.

Referring to the drawings, at 1 is the cutter, preferably blanked out of sheet steel in a circular form, its periphery 2 being ground down to a sharp edge. The center portion of this cutter is removed as at 3, leaving an inwardly projecting tooth 4 having its thrust edge 5 formed on a radial line, and the opposite edge 6 forming a straight line and running back to meet the circle of the center aperture whereby a strong and reinforced tooth is obtained.

The shaft 7 is made of the desired size and length to receive several hundred of these cutters, which are placed thereon one after the other, with a spacing collar 8 between them. At 9 this shaft is cut away leaving a flat space with a square shoulder 10 to receive the tooth 4 of the cutters. A slot or recess 11 is then preferably milled out, one side of which is in line with the face 10, said slot being formed wide enough to receive the abutment plate 13, together with its key or wedging strip 14. This abutment plate may be made of any desired material, but is preferably constructed from sheet steel in short length that can be readily tempered and prepared, the same being hardened either all over on its working face or only its engaging portion if desired to such a degree that the thrust or wear of the tooth of the cutter acting on this hardened surface can have no effect upon it. The adjoining ends of these plates are cut on an angle 15—15 so as not to leave a crack or aperture between them through which the tooth of one of the cutters might work. These plates, after having been thus prepared, are placed in the recess 11 in the shaft and a key or wedging strip 14 is also placed in the aperture side of the plate and the former forced tightly therein to hold the plate firmly in position. After this key has been driven home the edge 16 of the slot is turned or riveted over the same securely holding the whole in position. Another practical feature of this construction is that the key strip is made of soft material so that it can be milled out and removed to readily replace or repair any damaged or imperfect abutment plates found in the shaft. If this key were hard like the plate it would be a very difficult matter to remove the plate or the key after the same had once been inserted into the shaft, in which case the whole shaft would have to be thrown away, if for any cause one of the plates should become damaged.

Many methods have been tried for obtaining the desired result in a practical way, among others being hardening the shaft, and securing a hardened strip onto a flattened portion of the shaft by screws or rivets, but nothing has proved so practical, satisfactory and effective as the construction above described. In this way a shaft of ordinary steel may be used only requiring a short operation on a milling machine to place the same in condition to receive the hardened plates, which are readily attached thereto and made as secure and solid as the shaft itself, and at a minimum expense, and it is found in practice that cutters of any size and as thin as may be desired may be operated on this shaft without fear of in any way injuring the hardened surface of this abutment plate.

My improved method renders the cutter shaft, working under the conditions above explained, as practically indestructible, while previous to my invention the shafts were continually cut, the edge of the keyway being quickly destroyed and new shafts had to be fitted to take the place of the injured ones.

My invention is very practical, simple in its construction and effective in its operation.

Having thus described my invention, what I claim as new and desire to secure by Letters Patent, is:

1. In a device of the character described, the combination of a circular cutter blade, a shaft on which said blade is mounted, said shaft being provided with a slot, a hardened abutment plate adapted to fit edgewise into said slot to receive the thrust and wear of the cutter on its face, and a key strip forced into said slot to bind said plate in position therein.

2. In a device of the character described, the combination of a cutter blade, a shaft on which said blade is mounted, said shaft being provided with a slot, a hardened abutment plate adapted to fit into said slot to receive the thrust and wear of the cutter, a key strip forced into said slot to bind said plate in position therein the edge of said slot being turned over the edge of said key to rivet the same therein.

3. In a device of the character described, the combination of a circular cutter blade, a shaft on which said blade is mounted, a flattened portion on said shaft leaving an abutment or wall, said shaft being provided with a slot, a hardened plate adapted to fit edgewise in said slot and be backed up by said wall, said plate being adapted to receive the thrust and wear of the cutter on its face, and a key strip forced into said slot to bind said plate in position thereon.

4. In a device of the character described, the combination of a circular cutter blade, an internally projecting tooth on said blade, a shaft on which said blade is mounted, a flattened portion on said shaft to receive said tooth and form an abutment or wall, said shaft being also provided with a slot, a hardened plate adapted to fit edgewise in said slot and be backed up by said wall, said plate being adapted to engage said tooth and receive the thrust and wear of the cutter, a key strip forced into said slot to bind said plate in position thereon, the edge of said slot being turned over the edge of said key to rivet the same therein.

5. In a device of the character described, the combination of a circular cutter blade, a shaft on which said blade is mounted, said shaft being provided with a slot, a plurality of thin hardened abutment plates set end to end, the same being adapted to fit into said slot to receive the thrust and wear of the cutter, the adjacent ends of said plates being cut on an angle to fit together, and one or more key strips forced into said slot to bind said plate in position therein.

6. In a device of the character described, the combination of a circular cutter blade, a shaft on which said blade is mounted, said shaft being provided with a slot, a thin hardened abutment plate adapted to fit edgewise into said slot to receive the thrust and wear of the cutter on its face, a key formed of a thin strip of softer material forced into said slot to bind said plate in position therein, and means for holding said key in said slot.

In testimony whereof I affix my signature in presence of two witnesses

THOMAS MORTON.

Witnesses:
 HOWARD E. BARLOW,
 E. I. OGDEN.